United States Patent
Shi

(10) Patent No.: US 8,061,912 B2
(45) Date of Patent: Nov. 22, 2011

(54) KEYPAD ASSEMBLY AND PORTABLE ELECTRONIC DEVICE USING SAME

(75) Inventor: Zheng Shi, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1139 days.

(21) Appl. No.: 11/836,728

(22) Filed: Aug. 9, 2007

(65) Prior Publication Data

US 2008/0252492 A1   Oct. 16, 2008

(30) Foreign Application Priority Data

Apr. 11, 2007   (CN) .......................... 2007 1 0073883

(51) Int. Cl.
   *B41J 5/00* (2006.01)
   *B41J 5/14* (2006.01)
   *B41J 5/16* (2006.01)

(52) U.S. Cl. .............. 400/495; 400/485; 400/495.1

(58) Field of Classification Search ............... 400/495, 400/495.1, 485; *B41J 5/10, 5/12, 5/14, 5/16*
See application file for complete search history.

(56) References Cited

U.S. PATENT DOCUMENTS

| | | | | | |
|---|---|---|---|---|---|
| 3,860,771 A | * | 1/1975 | Lynn et al. | ............ | 200/5 A |
| 4,029,915 A | * | 6/1977 | Ojima | ............ | 708/145 |
| 4,201,489 A | * | 5/1980 | Zapp | ............ | 400/485 |
| 6,157,323 A | * | 12/2000 | Tso et al. | ............ | 341/22 |
| 7,271,361 B2 | * | 9/2007 | Sugimura et al. | ............ | 200/341 |
| 7,312,410 B2 | * | 12/2007 | Griffin et al. | ............ | 200/5 A |
| 2002/0041784 A1 | * | 4/2002 | Thomas | ............ | 400/472 |
| 2006/0018699 A1 | * | 1/2006 | Rak et al. | ............ | 400/486 |
| 2007/0247337 A1 | * | 10/2007 | Dietz et al. | ............ | 341/22 |

FOREIGN PATENT DOCUMENTS

| JP | 6103853 A | | 4/1994 |
|---|---|---|---|
| JP | 2004038897 A | | 2/2004 |
| JP | 2004133868 A | * | 4/2004 |

* cited by examiner

*Primary Examiner* — Daniel J Colilla
*Assistant Examiner* — Nguyen Q Ha
(74) *Attorney, Agent, or Firm* — Altis Law Group, Inc.

(57) ABSTRACT

A keypad assembly used in a portable electronic device (100) includes at least one key button (40) and at least one fixing member (30). Each key button is slidingly received in a receiving hole (26) defined in a cover (20) of the portable electronic device. The at least one fixing member is fixed on the cover. Each fixing member includes at least one latching portion (34) and a plurality of curved portions (32). Each latching portion connects with the curved/bias portions. Each latching portion firmly connects with at least one key button. The corresponding latching portion of the fixing member is configured for selectably pressing into a chosen switch (12) in the portable electronic device, so as to form/prompt an electronic signal when the key button is given an appropriate horizontal force to initiate such contact with a given switch.

3 Claims, 5 Drawing Sheets

KEYPAD ASSEMBLY AND PORTABLE ELECTRONIC DEVICE USING SAME

BACKGROUND OF THE INVENTION

1. Field of the Invention

The present invention relates to keypad assemblies and, particularly, to a keypad assembly used in an electronic device and to a portable electronic device, using the same.

2. Description of Related Art

With the development of wireless communication and information processing technologies, portable electronic devices, such as mobile telephones and personal digital assistants (PDAs), are now in widespread use. Such electronic devices allow consumers to enjoy high technology services, almost anytime and anywhere. A keypad assembly as an input terminal has been an indispensable member of a portable electronic device.

A typical keypad assembly being used in a portable electronic device includes a printed circuit board therein. Several fixed contact points are formed on the printed circuit board, and several dome switches are respectively disposed above the fixed contact points. The keypad usually includes a plurality of key buttons and a soft rubber base. The key buttons are fixed on the rubber base by adhesive. The rubber base is set above the printed circuit board, while the key buttons respectively correspond to the switches. In use, a key button is pressed down, and the rubber base is deformed accordingly. The rubber base presses a corresponding switch to touch a fixed contact point, so that an electronic signal is formed/generated. When the key button is released, it returns to its original state due to the elasticity of the rubber base.

Since miniaturization of the portable electronic device is desired, the space for fixing the keypad is limited. Therefore, the number of key buttons of the portable electronic device is also limited. In order to overcome this problem, each key button is desired to correspond to several operating functions, via, e.g., the pressing of particular key combinations and/or pressing the same key multiple times. However, the functions of the portable electronic device have increased dramatically, and each key button of the typical keypad assembly only corresponds to a dome switch. Therefore, the key button might need to be pressed several times to carry out a certain function, which brings inconvenience to the users. In addition, the elasticity of the rubber base gives the dome switch a poor tactile feel.

Therefore, a new keypad assembly is desired in order to overcome the above-described problems.

SUMMARY OF THE INVENTION

In one present embodiment thereof, a keypad assembly is used in a portable electronic device. The portable electronic device has a cover. The cover defines at least one receiving hole. The keypad assembly includes at least one key button and at least one fixing member. Each key button is slidingly received in a corresponding receiving hole. Each key button is exposed through one side of the cover. Each fixing member is fixed on/to the other, opposite side of the cover. Each fixing member includes at least one latching portion and a plurality of curved strips. Each latching portion connects with the curved strips. Each latching portion firmly connects with a corresponding key button and corresponds to two switches formed on a printed circuit board of the portable electronic device. When a horizontal force is applied to a given key button, a corresponding latching portion of the fixing member prompts an electronic signal by pressing a switch. When the force applied on/to the given key button is released, the given key button and the corresponding latching portion return to their original positions by rebounding (i.e., spring-action) of the curved strips.

Other advantages and novel features will become more apparent from the following detailed description when taken in conjunction with the accompanying drawings.

BRIEF DESCRIPTION OF THE DRAWINGS

Many aspects of the present keypad assembly can be better understood with reference to the following drawings. The components in the drawings are not necessarily drawn to scale, the emphasis instead being placed upon clearly illustrating the principles of the present keypad assembly. Moreover, in the drawings, like reference numerals designate corresponding parts throughout the several views.

DETAILED DESCRIPTION OF THE INVENTION

Figure 1:
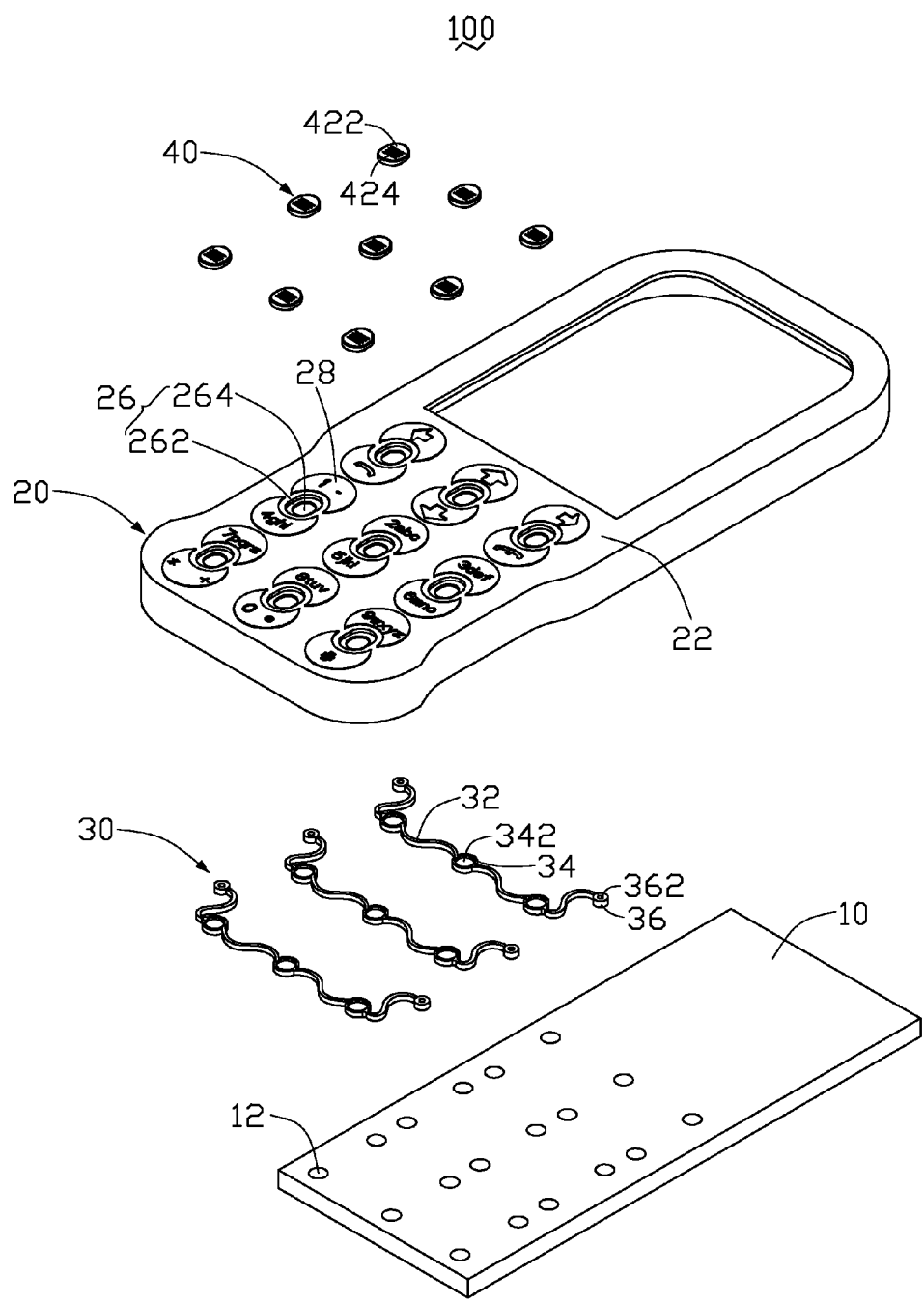
FIG. 1 is an exploded, isometric view of a portable electronic device, in accordance with a present embodiment, showing a cover, a keypad assembly, and a printed circuit board.
Figure 2:
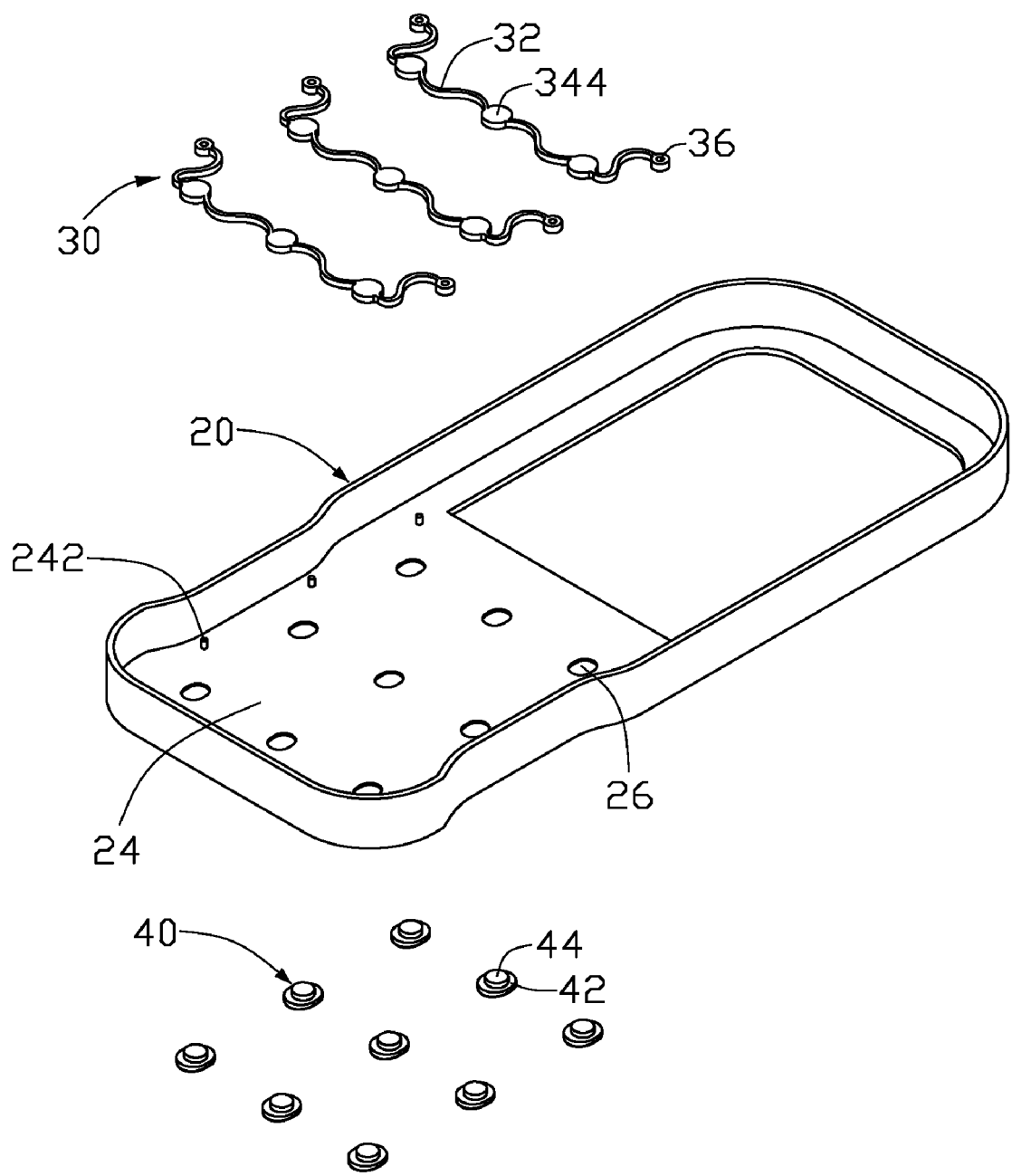
FIG. 2 is an another aspect view of the cover and the keypad assembly, shown in FIG. 1.

Referring now to FIGS. 1 and 2, the keypad assembly (not specifically labeled) used in a portable electronic device 100 includes a printed circuit board 10 therein, in accordance with an embodiment of the present invention. The keypad assembly is mounted in a cover 20 of the portable electronic device 100 and extends therethrough.

Several fixed contact points 14 (shown in FIG. 5) are formed on the printed circuit board 10, and several dome switches 12 are respectively disposed above the fixed contact points 14. When each dome switch 12 touches a corresponding fixed contact point 14, an electronic signal is formed/generated.

The cover 20 has an upper surface 22 and an opposite lower surface 24. A plurality of receiving holes 26 are defined in the cover 20 and are configured (i.e., structured and arranged) for receiving the key buttons 40. Each receiving hole 26 is stepped-shape and includes an enlarged hole 262 and a reduced hole 264, in communication with one another. The enlarged hole 262 extends to the upper surface 24, and the reduced hole 264 extends to the lower surface 24. A diameter of the enlarged hole 262 is larger than that of the reduced hole 264. The upper surface 22 has some characters 28 symmetrically printed/affixed on two opposite sides of each enlarged hole 262 along an X direction (in this embodiment, the X direction is the longitudinal/lengthwise direction of the portable electronic device 100, in order to make it simple and readily visualized in the drawings). Six positioning posts 242 protrude directly from the lower surface 24 of the cover 20 and are configured for attaching/mounting the fixing members 30 in place. The positioning posts 242 are symmetrically positioned beside/adjacent the receiving holes 26.

The keypad assembly includes several fixing members 30 and a plurality of key buttons 40. Each key button 40 includes an operation portion 42 and a connecting portion 44. The operation portion 42 is configured for being slidingly received in the enlarged hole 262 but not received in the reduced hole 264. The perimeter of the operation portion 42 may, advantageously, be oval, so that it might be easily pushed, although it is to be understood that other shapes could be employed (e.g., rectangle/square to facilitate a key array). The operation surface 422 (i.e., the upper/top surface) of the operation portion 42, usefully, has a concavely curved (i.e., inwardly curved) shape to promote gripping of a given key button 40. Some protruding ribs (not labeled) are, beneficially, formed on the central area of the operation surface 422, so as to form a grip portion 424 configured for facilitating pushing thereof by a user. It should be understood that the perimeter edges of the operation surface 422 of the key button 40 might, instead, be flat surfaces (e.g., as the case would be for a rectangle/square shape), and the protruding ribs formed on the central area of the operation surface 422 might be replaced by protruding points, which would likewise promote gripping.

The connecting portion 44 is a column (e.g., cylindrical in form) and extends from a central area of a bottom surface of the operation portion 42. The connecting portion 44 is, usefully, integrally formed with the operation portion 42. The connecting portion 44 is configured for being slidably received in the reduced hole 264. The curved/bias portions 32 may, advantageously, be integrally formed with the latching portions 34 and the fixing portions 36.

Each fixing member 30 may, advantageously, be made from a durable, resilient polymer, e.g., a plastic, such as acrylonitrile-butadiene-styrene (ABS), polyurethane, or acryl, or, potentially, an elastomeric material. Each fixing member 30 includes a plurality of curved/bias portions 32, a plurality of latching portions 34, and two fixing portions 36.

The curved/bias portions 32 generally have a bent, angled, or otherwise curved configuration. Such a configuration allows the curved portions 32 to exhibit a spring bias (i.e., to act as a spring). Thus, the curved portions 32 have an inherent tendency to return to an initial shape/position after a force is released therefrom.

The positions of the latching portions 34 respectively correspond to those of the receiving holes 26. Each latching portion 34 has an opening end 342 and a closing end 344. The opening ends 342 of the respective latching portions 34 are configured for receiving the corresponding connecting portions 44 of the key buttons 40.

The fixing portions 36 are, e.g., cylindrical and are connected with the latching portions 34 by the curved/bias portions 32. Each fixing portion 36 has a through hole 362 for slidably receiving a corresponding positioning post 242 therein.

Figure 3:
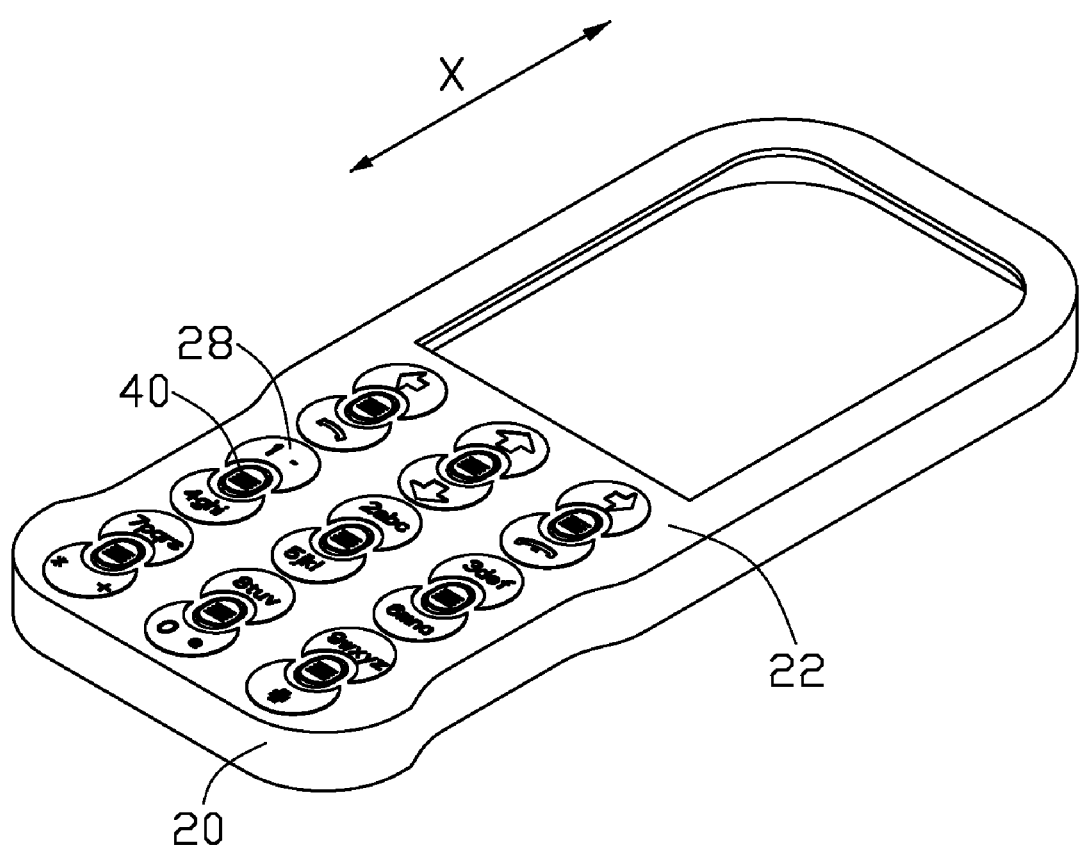
FIG. 3 is similar to FIG. 2, showing the key assembly mounted on the cover.
Figure 4:
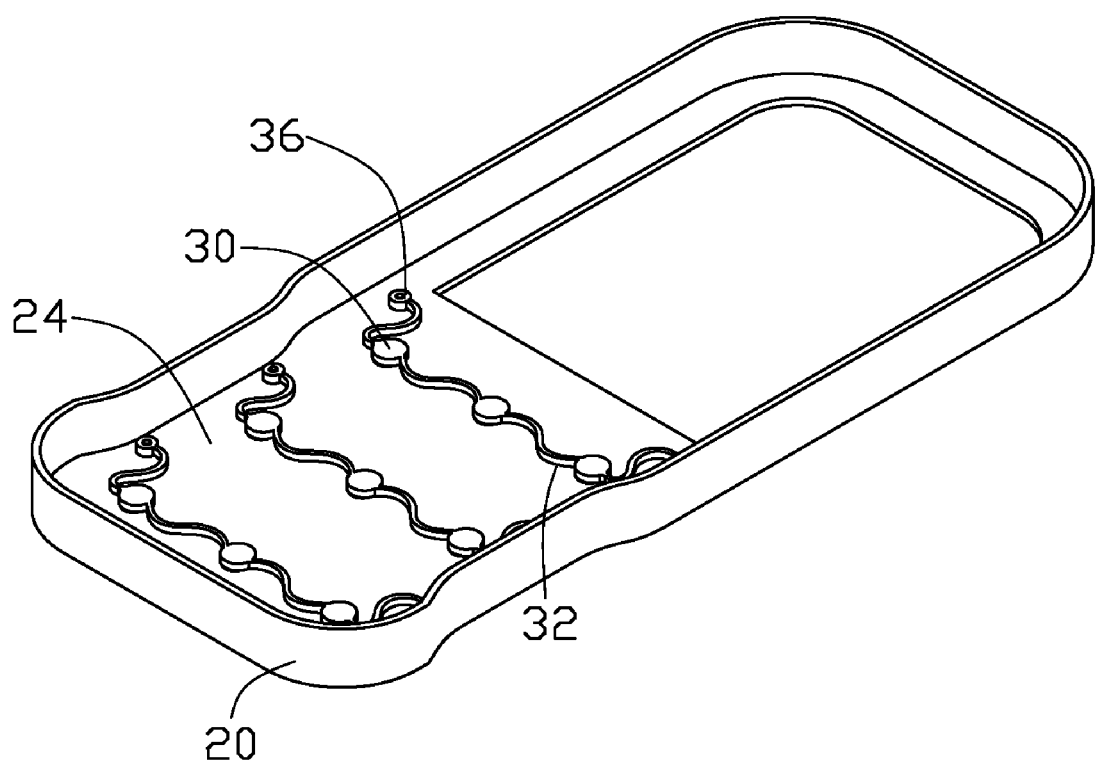
FIG. 4 is the similar to FIG. 3, showing another aspect.
Figure 5:
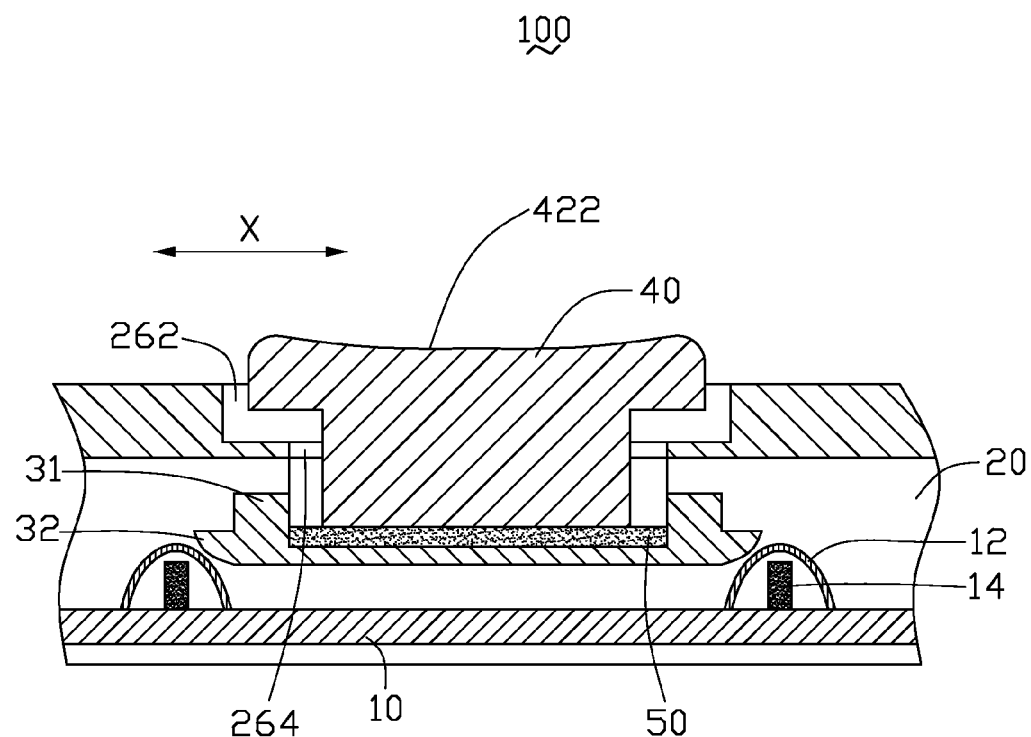
FIG. 5 is assembled, cut-away view of a portion of the portable electronic device, shown in FIG. 1.

Referring to FIGS. 3-5, in aggregating of the keypad assembly, firstly, the key buttons 40 are respectively fixed in the receiving holes 26. The operation portions 42 are respectively received in a corresponding enlarged hole 262. The connecting portions 44 of the key buttons 40 extend through and then out from a corresponding reduced hole 264. Each receiving hole 26 contains enough space for a corresponding key button 40 to move freely in an X direction (i.e., parallel to the longitudinal direction of the cover 20).

Each fixing member 30 is then placed on the lower surface of the cover 20, with the connecting portions 44 of the key buttons 40 respectively touching the close ends 344 of the latching portions 34, via the open end 342 thereof. The connecting portions 44 are fixed in a corresponding latching portion 34 of the fixing member 30, e.g., by adhesive 50.

After that, the positioning posts 242 of the cover 20 are respectively engaged in correspondence with a through hole 362 of the corresponding fixing member 30, so that the fixing members 30 are firmly mounted on the cover 20. The connection between a given positioning post 242 and a corresponding fixing member 30 can be reinforced, e.g., via an adhesive.

When the portable electronic device 100 is assembled, the printed circuit board 10 is identified under the fixing members 30. Each latching portion 34 corresponds to two dome switches 12.

In use, the key button 40 is laterally pushed along the X direction into contact with selectable one of a respective pair of the dome switches 12, so as to be operable upon/with the selected dome switch 12. The operation portion 42 and the connecting portion 44 are being laterally/horizontally moved, respectively, in the enlarged hole 262 and reduced hole 264. Accordingly, the given latching portion 34 connects firmly with the corresponding connecting portion 44 and moves toward a corresponding dome switch 12. At the same time, the curved/bias portions 32 connecting with the latching portion 34 undergo a change to their original shape (i.e., the change being a source of spring potential energy). When one end of the operation portion 42 or connecting portion 44 touches the cover 20, the key button 40 stops moving. At the same time, the dome switch 12 is pressed into and touches the fixed contact point 14 therein, so that an electronic signal is formed/initiated. When the applied pressure on the key button 40 is released, the curved portions 32 rebound to their original configuration. Due to this rebounding action, the latching portion 34 and the key button 40 return to their initial location.

In an alternative embodiment of the present keyboard assembly, the enlarged hole 262 is omitted and the operation portion 42 of the key button 40 is disposed directly upon the upper surface 22 of the cover 20.

In another alternative embodiment of the present keyboard assembly, the operation portion 42 of the key button 40, as distinct portion thereof, is omitted and the connecting portion 44 is defined as a column that extends through the cover 20.

In an additional alternative embodiment of the present keyboard assembly, the latching portion 34 is a solid body, and the connecting portion 44 is soldered or welded to the fixing member 30.

It should be understood that each key button 40 corresponds to a respective two dome switches 12, which might potentially reduce the number of times of a key button 40 may have to be operated so as to gain a certain function (i.e., by being able to selectably associate with two distinct dome switches 12, each key button 40 can effectively act as two function initiators) and/or permit for greater functionality, while allowing the number of key buttons is unchanged. In addition, the key buttons 40 firmly connect with the connecting portions 31, so that the tactile feel of a user is strong and consistent when the key button 40 touches a corresponding dome switch 12.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A keypad assembly fixed relative to a cover of a portable electronic device, the cover having at least one receiving hole, the keypad assembly comprising:

at least one key button, each key button being slidingly received in a corresponding receiving hole and exposed at one side of the cover; and at least one fixing member fixed to another side of the cover, each fixing member including at least one latching portion and a plurality of curved portions, each latching portion connecting with at least one curved portion, each latching portion firmly connecting with a corresponding key button;

a plurality of positioning posts formed on the cover, each fixing member having two ends and a fixing portion formed at each end thereof, each fixing portion having a through hole defined therein, and each through hole being engaged with a corresponding positioning post;

wherein each latching portion corresponds to a respective pair of two switches formed on a printed circuit board of the portable electronic device, when the key button is slid by a force along the longitudinal/lengthwise direction of the portable electronic device, the latching portion selectively presses one of the corresponding pair of two switches for initiating an electronic signal;

the plurality of curved portions pushing the key button to return the key button to an original unbiased position when the force sliding the key button is released.

2. A portable electronic device, comprising:

a cover defining at least one receiving hole therein; a printed circuit board having a plurality of fixed contact points being formed thereon and having a plurality of dome switches respectively disposed above the fixed contact points;

at least one key button, each key button being slidingly received in a corresponding receiving hole of the cover; and at least one fixing member, each fixing member being fixed on the cover, each fixing member including at least one latching portion, each key button being firmly connected with a corresponding latching portion, each latching portion corresponding to a respective pair of dome switches;

a plurality of curve portions and a plurality of spaced latching portions alternatively arranged each other to form an integral piece;

wherein the latching portion is configured for selectably pressing against one of the respective pair of dome switches so as to form an electronic signal when the corresponding key button is slid along a longitudinal/lengthwise direction of the portable electronic device to cause a selected dome switch to impinge upon a given fixed contact point, and the latching portion and the corresponding key button return to their original location by means of the spring action of the corresponding fixing member.

3. A keypad assembly fixed relative to a cover of a portable electronic device, the cover having at least one receiving hole, the keypad assembly comprising:

a plurality of key buttons, each key button being slidingly received in a corresponding receiving hole and exposed at one side of the cover; and at least one fixing member fixed to another side of the cover, each fixing member including a plurality of latching portions and a plurality of curved portions alternatively arranged with each other to form an integral piece, each latching portion firmly connecting with a corresponding key button;

wherein each latching portion corresponds to a respective pair of two switches formed on a printed circuit board of the portable electronic device, the latching portion positioned in line with the corresponding pair of two switches; when a key button is slid by a force, a corresponding latching portion selectively presses one of the corresponding pair of two switches for initiating an electronic signal;

the plurality of curved portions of the at least one fixing member pushing the key button to return the key button to an original unbiased position when the force sliding the key button is released.

* * * * *